•

US008288303B2

(12) United States Patent
Higashi et al.

(10) Patent No.: US 8,288,303 B2
(45) Date of Patent: Oct. 16, 2012

(54) HYDROCRACKING CATALYST AND PROCESS FOR PRODUCING FUEL BASE MATERIAL

(75) Inventors: Masahiro Higashi, Yokohama (JP); Hiroyuki Seki, Yokohama (JP); Sumio Saito, Kitakyusyu (JP); Ryuzo Kuroda, Kitakyusyu (JP); Takashi Kameoka, Kitakyusyu (JP)

(73) Assignee: Nippon Oil Corporation, Tokyo (JP)

(*) Notice: Subject to any disclaimer, the term of this patent is extended or adjusted under 35 U.S.C. 154(b) by 922 days.

(21) Appl. No.: 12/294,922

(22) PCT Filed: Mar. 22, 2007

(86) PCT No.: PCT/JP2007/056744
§ 371 (c)(1),
(2), (4) Date: Sep. 27, 2008

(87) PCT Pub. No.: WO2007/114200
PCT Pub. Date: Oct. 11, 2007

(65) Prior Publication Data
US 2010/0170828 A1    Jul. 8, 2010

(30) Foreign Application Priority Data

Mar. 30, 2006 (JP) ................................. 2006-094963

(51) Int. Cl.
*C01B 33/36* (2006.01)
*B01J 29/06* (2006.01)
*C07C 7/13* (2006.01)

(52) U.S. Cl. .......... 502/64; 502/66; 208/310 Z; 423/718
(58) Field of Classification Search .................... None
See application file for complete search history.

(56) References Cited

U.S. PATENT DOCUMENTS

| 2,995,423 | A | * | 8/1961 | Breck et al. .................... 423/718 |
| 3,130,007 | A | * | 4/1964 | Breck ............................. 423/711 |
| 3,622,501 | A | | 11/1971 | Bertolacini et al. |
| 3,862,898 | A | | 1/1975 | Boyd et al. |
| 3,993,557 | A | | 11/1976 | Pine |
| 4,182,693 | A | | 1/1980 | Gladrow |
| 4,500,645 | A | | 2/1985 | Fuchikami et al. |
| 4,584,089 | A | | 4/1986 | Unmuth et al. |
| 4,585,748 | A | | 4/1986 | Usui et al. |
| 4,600,498 | A | | 7/1986 | Ward |
| 4,789,654 | A | | 12/1988 | Hirano et al. |
| 5,120,425 | A | | 6/1992 | Zones et al. |
| 5,318,692 | A | | 6/1994 | Eberly, Jr. et al. |
| 5,620,590 | A | | 4/1997 | Absil et al. |
| 6,235,960 | B1 | | 5/2001 | Benazzi et al. |
| 6,576,119 | B2 | | 6/2003 | Ishida et al. |
| 6,821,412 | B1 | | 11/2004 | Fujukawa et al. |
| 7,192,900 | B2 | * | 3/2007 | Creyghton et al. .............. 502/79 |
| 7,700,818 | B2 | | 4/2010 | Aoki et al. |
| 2003/0000867 | A1 | | 1/2003 | Reynolds |
| 2004/0256287 | A1 | * | 12/2004 | Miller et al. .................... 208/58 |
| 2005/0145541 | A1 | | 7/2005 | Sakoda et al. |
| 2007/0029228 | A1 | | 2/2007 | Aoki et al. |

FOREIGN PATENT DOCUMENTS

| CN | 1220238 | * | 6/1999 |
| EP | 0 537 815 A1 | | 4/1993 |
| EP | 1547683 | * | 9/2003 |
| GB | 1011771 | | 12/1965 |
| JP | 50-008996 A | | 1/1975 |
| JP | 57-207546 A | | 12/1982 |
| JP | 59-203639 A | | 11/1984 |
| JP | 59-216635 A | | 12/1984 |
| JP | 61-126196 A | | 6/1986 |
| JP | 02-214544 A | | 8/1990 |
| JP | 04-505124 T | | 9/1992 |
| JP | 6-41549 A | | 2/1994 |
| JP | 7-501308 A | | 2/1995 |
| JP | 07-323230 A | | 12/1995 |
| JP | 2004-255241 A | | 9/2004 |
| JP | 2005-279382 A | | 10/2005 |
| WO | 9013615 A1 | | 11/1990 |
| WO | 93/25477 A1 | | 12/1993 |

OTHER PUBLICATIONS

Schrimpf, Gerhard, et al. "Molecular Dyanmics Simulation of Zeolite NaY. A Study of STructure, Dynamics and Thermalization of Sorbates". J. Phys. Chem. 96, 7404-7410 (1992).*
Grzechowiak, J.R., et al., "Determination of the Hydrocracking and Hydroisomerization Activities of Catalysts Containing Zeolites Y and ZSM-5 for High Boiling Hydrocarbons Conversion", Collection of Czechoslovak Chemical Communications, vol. 52, No. 6, pp. 1545-1549 (1987).
Martens et al, "The potential and limitation of the n-decane hydroconversion as a test reaction for characterization of the void space of molecular seive ziolites," Zeolites, vol. 6, pp. 334-348 (1986).
Office Action issued Jan. 26, 2009 in U.S. Appl. No. 11/074,567.
Office Action issued Mar. 18, 2008 in U.S. Appl. No. 11/074,567.
Office Action issued Apr. 24, 2008 in U.S. Appl. No. 11/532,640.
Office Action issued May 21, 2009 in U.S. Appl. No. 11/074,567.
Office Action issued Jun. 22, 2009 in U.S. Appl. No. 12/178,691.
Office Action issued Jul. 24, 2007 in U.S. Appl. No. 11/532,640.
Office Action issued Aug. 1, 2008 in U.S. Appl. No. 11/074,567.
Office Action issued Sep. 23, 2009 in U.S. Appl. No. 11/074,567.

* cited by examiner

*Primary Examiner* — Melvin C Mayes
*Assistant Examiner* — Sheng H Davis
(74) *Attorney, Agent, or Firm* — Panitch Schwarze Belisario & Nadel LLP

(57) ABSTRACT

Provided is a catalyst for hydrocracking a paraffinic hydrocarbon which provides satisfactorily high cracking activity and middle fraction yield as well as the low pour point of the fuel base material (the middle fraction) all together. The catalyst of the present invention comprises a USY zeolite derived from NaY used as the raw material and having a peak intensity of 30 or lower, appearing on the 111 surface upon X-ray diffraction, and a noble metal of Group VIII of the periodic table.

9 Claims, No Drawings

HYDROCRACKING CATALYST AND PROCESS FOR PRODUCING FUEL BASE MATERIAL

CROSS-REFERENCE TO RELATED APPLICATION

This application is a section 371 of International Application No. PCT/JP2007/056744, Filed Mar. 22, 2007, which was published in the Japanese language on Oct. 11, 2007 under International Publication No. WO 2007/114200 A1 and the disclosure of which is incorporated herein by reference.

FIELD OF THE INVENTION

The present invention relates to catalysts used for producing a fuel base material from paraffinic hydrocarbons in the presence of hydrogen and processes for producing the fuel base material using the catalysts.

BACKGROUND OF THE INVENTION

In recent years, a demand to an environment friendly liquid fuel with less sulfur components and aromatic hydrocarbons has been rapidly enhanced. Various studies have been carried out by fuel oil manufacturers to provide processes for producing an environment friendly liquid fuel. Among others, a process wherein a paraffinic hydrocarbon such as wax is converted to an environment friendly liquid fuel by hydrocracking in the presence of a catalyst has been studied as one measure.

It is particularly important in a process for hydrocracking a paraffinic hydrocarbon to produce a useful middle fraction at high yields with the objective of improving the economical efficiency of the process. Furthermore, the resulting fuel base material (the middle fraction) is importantly low in pour point. That is, the development of a highly efficient hydrocracking catalyst which is high in cracking activity and middle fraction yield and can provide the resulting fuel base material (the middle fraction) with a low pour point holds the key to improve the economical efficiency of the process.

Hydrocracking of vacuum gas oil has been already commercialized and is an established technique which has been used for some decades. However, since the reactivity of a paraffinic hydrocarbon mainly composed of n-paraffin is significantly different from that of a vacuum gas oil, it is difficult to divert a catalyst therefor to hydrocrack the paraffinic hydrocarbon. Therefore, research and development have been vigorously continued to achieve the development of highly efficient catalyst for hydrocracking a paraffinic hydrocarbon. Although very few, there are some patents and reports concerning such studies. For example, Patent Document 1 below discloses a catalyst comprising a support containing silica-alumina, and platinum supported thereon. In Patent Document 2, there is an example of study wherein a paraffinic hydrocarbon was hydrocracked using a catalyst comprising platinum supported on a USY zeolite.

In general, zeolite has a satisfactory level of cracking activity but has deficiencies that it is low in middle fraction yield and fails to provide the resulting fuel base material (the middle fraction) with a sufficient low pour point. On the other hand, an amorphous solid acid catalyst a typical example of which is silica-alumina is in a satisfactorily high level in terms of middle fraction yield and fuel base material (the middle fraction) pour point but is low in cracking activity. That is, a catalyst satisfying all the requirements of high cracking activity, high middle fraction yield, and low pour point of fuel base material (the middle fraction) has not been developed yet, resulting in a serious obstacle to improve the economical efficiency of a process for hydrocracking a paraffinic hydrocarbon.

(1) Japanese Patent Laid-Open Publication No. 6-41549
(2) Japanese Patent Laid-Open Publication No. 2004-255241

DISCLOSURE OF THE INVENTION

The present invention has an object to provide a catalyst satisfying all high cracking activity, high middle fraction yield, and the low pour point of fuel base material (the middle fraction), for producing a fuel base material from a paraffinic hydrocarbon and a process for producing a fuel base material using the catalyst thereby improving the economical efficiency of the process.

As the results of extensive researches and studies, the present invention was achieved on the basis of the finding that the above-described object was able to be achieved using a catalyst comprising a USY zeolite derived from NaY used as the raw material and having a peak intensity of 30 or lower, appearing on the 111 surface (2θ=5.0 to 6.0°) upon X-ray diffraction.

The term "peak intensity" used herein denotes a total peak height at 2θ=5.0 to 6.0° when the total peak height at 2θ=4 to 120° is taken to be 100.

That is, the present invention relates to a catalyst for hydrocracking a paraffinic hydrocarbon, comprising the above-described USY zeolite and a noble metal of Group VIII of the periodic table.

The present invention also relates to a process for producing a fuel base material, comprising hydrocracking a paraffinic hydrocarbon using the aforesaid catalyst.

EFFECTS OF THE INVENTION

The use of the catalyst of the present invention can achieve the production of a liquid hydrocarbon wherein high cracking activity, middle fraction yield, and the low pour point of the fuel base material (the middle fraction) are all satisfied.

BEST MODE OF CARRYING OUT THE INVENTION

The present invention will be described in more detail below.

The USY zeolite used in the present invention is derived from the raw material which is NaY having a peak intensity of 30 or lower and preferably from 20 to 25, appearing on the 111 surface upon X-ray diffraction. The silica-alumina molar ratio of this USY zeolite is usually within the range of 20 to 140 and preferably 30 to 80.

The average particle size of the USY zeolite is preferably 1.0 μm or smaller and more preferably 0.5 μm or smaller.

The hydrocracking catalyst of the present invention may contain the USY zeolite alone as an active component but may further contain an amorphous solid acid for further improving the performance. Examples of the amorphous solid acid include silica-alumina, silica-titania, silica-zirconia, and alumina-boria. Preferred examples include one or more types of solid acids selected from silica-alumina, silica-zirconia, and alumina-boria.

There is no particular restriction on the amorphous solid acid/USY zeolite mass ratio in the catalyst. However, the mass ratio is within the range of preferably 0.1 to 80 and more preferably 1 to 60.

There is no particular restriction on a binder used for molding the catalyst. The binder is preferably alumina, silica, titania, or magnesia and most preferably alumina. There is no particular restriction on the proportion of the binder in the whole molded catalyst. However, the binder is contained in an amount of usually 5 to 99 percent by mass and preferably 20 to 99 percent by mass.

The content of the USY zeolite in the catalyst of the present invention is preferably from 0.1 to 15 percent by mass and more preferably 1 to 10 percent by mass on the basis of the total mass of the molded catalyst containing the binder.

The catalyst of the present invention contains necessarily a noble metal of Group VIII of the periodic table, as an active component. If a metal other than the noble metals of Group VIII of the periodic table is used as an active metal, the object of the present invention can not be achieved because the middle fraction yield is significantly reduced.

Specific examples of the noble metal of Group VIII include cobalt, nickel, rhodium, palladium, iridium, and platinum. Most preferred examples include palladium and platinum. These noble metals are supported on the above-described molded support by a conventional method such as impregnation or ion-exchange thereby producing the catalyst of the present invention.

If necessary, two or more types of the noble metals may be supported in combination. For example, both platinum and palladium may be supported. There is no particular restriction on the amount of these noble metals. The amount is usually from 0.02 to 2 percent by mass on the basis of the total mass of the catalyst.

The term "paraffinic hydrocarbon" used herein denotes a hydrocarbon whose paraffin molecule content is 70 percent by mole or more. There is no particular restriction on the carbon number of the paraffinic hydrocarbon. Hydrocarbons having 15 to 100 carbon atoms are usually used. The catalyst of the present invention is more effective in hydrocracking paraffinic hydrocarbons having 20 or more carbon atoms, generally referred to as wax.

There is no particular restriction on the process for producing the paraffinic hydrocarbon used as a feedstock. The catalyst of the present invention is applicable to various paraffinic hydrocarbons which may be petroleum-based or synthetic. Particularly preferred examples of the paraffinic hydrocarbons include so-called FT-waxes produced through Fischer-Tropsch synthesis.

The catalyst of the present invention may be used in a conventional fixed bed reactor. The reaction is carried out under conditions of a temperature of 200 to 450° C., a hydrogen pressure of 0.5 to 12 MPa, and a paraffinic hydrocarbon feedstock liquid hourly velocity of 0.1 to 10/h and preferably a temperature of 250 to 400° C., a hydrogen pressure of 2.0 to 8.0 MPa, and a paraffinic hydrocarbon feedstock liquid hourly velocity of 0.3 to 5.0/h.

As described above, the use of the catalyst containing a USY zeolite derived from a raw material which is NaY having a peak intensity of 30 or lower, which peak intensity appears on the 111 surface upon X-ray diffraction and a noble metal of Group VIII of the periodic table for hydrocracking a paraffinic hydrocarbon enables the production of a liquid hydrocarbon while satisfying high cracking activity, high middle fraction yield and the low pour point of the fuel base material (the middle fraction) all together.

APPLICABILITY IN THE INDUSTRY

The use of the catalyst of the present invention for hydrocracking paraffinic hydrocarbons can achieve the production of a liquid hydrocarbon wherein high cracking activity, middle fraction yield, and the low pour point of the fuel base material (the middle fraction) are all satisfied.

EXAMPLES

Hereinafter, the present invention will be described in more details by way of the following examples and comparative example, which should not be construed as limiting the scope of the invention.

Example 1

A column-shaped support with a diameter of 1/16 inch (about 1.6 mm), composed of 70 g of a USY zeolite (a) (silica-alumina ratio of 36, average particle size of 0.8 μm) derived from the raw material of NaY (a) having a peak intensity of 23 appearing on the 111 surface upon X-ray diffraction and 930 g of an alumina binder was impregnated with a water soluble solution of dichlorotetraamine platinum (II) in an amount of 0.8 percent by mass in terms of platinum on the basis of the support. The impregnated support was dried at a temperature of 120° C. for 3 hours and then calcined at a temperature of 500° C. for one hour thereby producing a catalyst.

The USY zeolite (a) was produced through the following steps.

(First Step)

To 1.250 kg of an aqueous solution of 22.76 percent by mass of sodium hydroxide was added to 0.164 kg of a sodium aluminate aqueous solution containing 17.0 percent by mass of Na$_2$O and 22.0 percent by mass of Al$_2$O$_3$, while being stirred. This solution was added to 1.324 kg of No. 3 sodium silicate with a SiO$_2$ concentration of 24.0 percent by mass, while being stirred thereby obtaining a seed composition. The oxide molar ratio of each of the components contained in the seed composition is set forth in formula (1):

$$16Na_2O.Al_2O_3.15SiO_2.320H_2O \quad (1).$$

This seed composition was stirred for 30 minutes and then allowed to stand at a temperature of 30 to 35° C. for 13 hours to be aged thereby obtaining 2.737 kg of Y type zeolite seed.

(Second Step)

Added to 19.387 kg of pure water was 22.043 kg of No. 3 sodium silicate with an SiO$_2$ concentration of 24.0 percent by mass, followed by stirring and mixing. Further, added to the mixture was 17.160 kg of silica-gel with an SiO$_2$ concentration of 30.0 percent by mass (Cataloid SI-30 manufactured by CATALYSTS&CHEMICALS IND. CO., LTD), followed by well-stirring and mixing. To the mixture were added 2.737 kg of the seed obtained in First Step, and then 9.109 kg of a sodium aluminate aqueous solution containing 17.0 percent by mass of Na$_2$O and 22.0 percent by mass of Al$_2$O$_3$, followed by mixing sufficiently until being uniform. The mixture was stirred at room temperature for 3 hours to be aged thereby obtaining a reaction mixture. The composition of the reaction mixture expressed by the oxide molar ratio is represented by formula (2):

$$2.9Na_2O.Al_2O_3.9.0SiO_2.150H_2O \quad (2).$$

(Third Step)

The reaction mixture obtained in Second Step was crushed in a colloid mill 5 times and then transferred to a crystallizer and aged by heating at a temperature of 95° C. for 48 hours until being crystallized. After aging, the interior of the crystallizer was cooled, and the resulting aged product was taken out therefrom. The product was sequentially filtered, washed, and dried thereby obtaining about 9 kg of NaY (a). The NaY (a) had a peak intensity of 23 appearing on the 111 surface upon X-ray diffraction, an average particle size of 0.8 μm, a crystallinity of 1.05, a lattice constant of 24.67 Å, a silica-alumina ratio of 5.1 and a specific surface area of 725 m²/g.

(Fourth Step)

The NaY (a) obtained in Third Step was suspended in 6 L of hot water kept at a temperature of 60° C., and added thereto was 2.64 kg of ammonium sulfate of equimolar to the Nay (a), followed by stirring for 30 minutes to be ion-exchanged. Thereafter, the mother water was filtered out, and then the ion-exchanged zeolite was again ion-exchanged in a solution obtained by dissolving 2.64 kg of ammonium sulfate in 20 L of hot water kept at a temperature of 60° C. The ion-exchanged zeolite was filtered, washed with 90 L of hot water kept at a temperature of 60° C., and dried thereby obtaining NH₄Y the 65 percent of which was ion-exchanged.

(Fifth Step)

The NH₄Y obtained in Fourth Step was placed in a rotary steamer and steam-calcined at a temperature of 670° C. for 30 minutes under saturated steam atmosphere thereby obtaining HY. The resulting HY type zeolite was suspended in 90 L of hot water kept at a temperature of 60° C. and passed through a colloid mill so as to crumb the cakes. To the HY type zeolite was added 10.56 kg of ammonium sulfate of 4 time molar amount of the NY. The mixture was ion-exchanged, while being stirred, at a temperature of 90° C. for one hour and then filtered, washed with 90 L of hot water kept at 60° C., and dried thereby obtaining NH₄Y the 90% of which was ion-exchanged. The resulting NH₄Y was placed in a rotary steamer and steam-calcined at a temperature of 700° C. for 30 minutes under saturated steam atmosphere thereby obtaining about 6.5 kg of crude USY zeolite.

(Sixth Step)

Suspended in 20 L of water was 5.0 kg of the crude USY zeolite obtained in Fifth Step. The suspended USY zeolite was passed through a colloid mill so as to crumb the cakes. Added to the zeolite was 5.027 kg of 25 percent sulfuric acid, followed by stirring at a temperature of 70° C. for one hour so as to remove the alumina. The remaining product was filtered, washed with water, and dried thereby obtaining about 1.5 kg of USY zeolite (a). The USY zeolite (a) had a crystallinity of 1.04, a lattice constant of 24.35 Å, a silica-alumina ratio of 36 and a specific surface area of 753 m²/g.

The catalyst (200 ml) thus obtained was charged into a fixed bed flow-through reactor and used for hydrocracking a paraffinic hydrocarbon. The feedstock, i.e., paraffinic hydrocarbon was an FT wax containing 95% paraffins and having a carbon number distribution of 21 to 80. The hydrogen pressure was 5 MPa while the liquid hourly velocity of the feedstock was 2.0/h. The fraction with a boiling point of 360° C. was defined as the cracked product. The reaction temperature at which the cracked product in an amount of 80 percent by mass of the feedstock was obtained was measured. Furthermore, the middle fraction (boiling point of 145 to 360° C.) yield with respect to the feedstock and the pour point of the middle fraction were also measured. The results are set forth in Table 1.

Example 2

A column-shaped support with a diameter of ¹/₁₆ inch (about 1.6 mm) was produced by molding 70 g of the same USY zeolite (a) as that used in Example 1, 530 g of silica-alumina powder, and 400 g of alumina used as a binder. On the support was supported platinum in such an amount that the content thereof was made 0.8 percent by mass of the support, by the same method as that of Example 1. The support was dried at a temperature of 120° C. for 3 hours and calcined at a temperature of 500° C. for one hour thereby producing a catalyst.

Hydrocracking was carried out using the catalyst similarly to Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

Example 3

A column-shaped support with a diameter of ¹/₁₆ inch (about 1.6 mm) was produced by molding 70 g of the same USY zeolite (a) as that used in Example 1, 530 g of alumina-boria, and 400 g of alumina used as a binder. On the support was supported platinum in such an amount that the content thereof was made 0.8 percent by mass of the support, by the same method as that of Example 1. The support was dried at a temperature of 120° C. for 3 hours and calcined at a temperature of 500° C. for one hour thereby producing a catalyst.

Hydrocracking was carried out using the catalyst similarly to Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

Example 4

A column-shaped support with a diameter of ¹/₁₆ inch (about 1.6 mm) was produced by molding 70 g of a USY zeolite (b) (silica-alumina ratio of 36, average particle size of 0.4 μm) derived from the raw material of NaY (b) having a peak intensity of 23 appearing on the 111 surface upon X-ray diffraction, 530 g of alumina-boria, and 400 g of alumina used as a binder. On the support was supported platinum in such an amount that the content thereof was made 0.8 percent by mass of the support, by the same method as that of Example 1. The support was dried at a temperature of 120° C. for 3 hours and calcined at a temperature of 500° C. for one hour thereby producing a catalyst.

The NaY (b) was prepared by the same procedures of Example 1 except that the reaction mixture obtained in Second Step of Example 1 was repeatedly passed through a colloid mill 10 times to crush the coarse particles sufficiently. The NaY (b) had a peak intensity of 23 appearing on the 111 surface upon X-ray diffraction, an average particle size of 0.4 μm, a crystallinity of 1.04, a lattice constant of 24.66 Å, a silica-alumina ratio of 5.0 and a specific surface area of 728 m²/g. The USY zeolite (b) was prepared by the same procedures of Example 1 except that the NaY (b) was used. The USY zeolite (b) had a crystallinity of 1.05, a lattice constant of 24.36 Å, a silica-alumina ratio of 36 and a specific surface area of 782 m²/g.

Hydrocracking was carried out using the catalyst similarly to Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

Example 5

A column-shaped support with a diameter of ¹/₁₆ inch (about 1.6 mm) was produced by molding 30 g of the same USY zeolite (b) as that used in Example 4 and 970 g of alumina used as a binder. On the support was supported platinum in such an amount that the content thereof was made 0.8 percent by mass of the support, by the same method as that of Example 1. The support was dried at a temperature of 120° C. for 3 hours and calcined at a temperature of 500° C. for one hour thereby producing a catalyst.

Hydrocracking was carried out using the catalyst similarly to Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

Example 6

A column-shaped support with a diameter of 1/16 inch (about 1.6 mm) was produced by molding 30 g of the same USY zeolite (b) as that used in Example 4, 530 g of alumina-boria, and 440 g of alumina used as a binder. On the support was supported platinum in such an amount that the content thereof was made 0.8 percent by mass of the support, by the same method as that of Example 1. The support was dried at a temperature of 120° C. for 3 hours and calcined at a temperature of 500° C. for one hour thereby producing a catalyst.

Hydrocracking was carried out using the catalyst similarly to Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

Comparative Example 1

Catalyst preparation and hydrocracking reaction were carried out in accordance with the procedures of Example 1 except for using a USY zeolite (c) (a silica-alumina ratio of 37, an average particle size of 1.3 μm) derived from the raw material of NaY (c) having a peak intensity of 37 appearing on the 111 surface upon X-ray diffraction to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

The NaY (c) was prepared by the same procedures of Example 1 except that the reaction mixture obtained in Second Step of Example 1 was passed through a colloid mill once to crumb the cakes. The NaY (c) had a peak intensity of 37 appearing on the 111 surface upon X-ray diffraction, an average particle size of 1.3 μm, a crystallinity of 1.05, a lattice constant of 24.66 Å, a silica-alumina ratio of 5.1 and a specific surface area of 721 m$^2$/g. The USY zeolite (c) had a crystallinity of 1.03, a lattice constant of 24.35 Å, a silica-alumina ratio of 37 and a specific surface area of 758 m$^2$/g.

Comparative Example 2

Catalyst preparation and hydrocracking reaction were carried out in accordance with the procedures of Example 3 except for using the same USY zeolite (c) as that used in Comparative Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

Comparative Example 3

Catalyst preparation and hydrocracking reaction were carried out in accordance with the procedures of Example 6 except for using the same USY zeolite (c) as that used in Comparative Example 1 to measure the reaction temperature at which the cracked product in an amount of 80 percent by mass of the feedstock was obtained as well as the middle fraction (boiling point of 145 to 360° C.) yield with respect to the feedstock and the pour point of the middle fraction. The results are set forth in Table 1.

As apparent from Table 1, it is confirmed that high cracking activity, high middle fraction yield and low pour point are all satisfied using a USY zeolite derived from the raw material which is NaY having a peak intensity of 30 or lower, appearing on the 111 surface upon X-ray diffraction. It is also apparent that the use of an amorphous solid acid in combination is more effective.

TABLE 1

| | Cracking Temperatrue ° C. | Middle Fraction Yield mass % | Pour Point of the Fuel Base Material (Middle Fraction) ° C. |
|---|---|---|---|
| Example 1 | 337 | 60.1 | −35.0 |
| Example 2 | 310 | 60.0 | −37.5 |
| Example 3 | 315 | 60.6 | −35.0 |
| Example 4 | 311 | 60.9 | −35.0 |
| Example 5 | 330 | 61.1 | −37.5 |
| Example 6 | 309 | 62.1 | −37.5 |
| Comparative Example 1 | 352 | 52.4 | −32.5 |
| Comparative Example 2 | 335 | 53.9 | −35.0 |
| Comparative Example 3 | 332 | 55.6 | −35.0 |

The invention claimed is:

1. A catalyst for hydrocracking a paraffinic hydrocarbon, comprising a USY zeolite derived from NaY used as a raw material and having a peak intensity of not more than 30, appearing on a 111 surface upon X-ray diffraction, and a noble metal of Group VIII of the Periodic Table.

2. The catalyst according to claim 1, wherein an average particle size of the USY zeolite is not more than 1.0 μm.

3. The catalyst according to claim 1, further comprising an amorphous solid acid.

4. The catalyst according to claim 3, wherein the amorphous solid acid is at least one selected from the group consisting of silica-alumina, silica-zirconia, and alumina-boria.

5. The catalyst according to claim 3, wherein a mass ratio of the amorphous solid acid to the USY zeolite is at least one and not more than 60.

6. The catalyst according to claim 1, wherein a content of the USY zeolite is from 0.1 to 15 percent by mass.

7. The catalyst according to claim 1, wherein a silica-alumina molar ratio of the USY zeolite is in a range of 20 to 140.

8. The catalyst according to claim 1, wherein the NaY has a peak intensity of from 20 to 25.

9. A process for producing a fuel base material, comprising hydrocracking a paraffinic hydrocarbon using a catalyst comprising a USY zeolite derived from NaY used as a raw material and having a peak intensity of not more than 30, appearing on a 111 surface upon X-ray diffraction, and a noble metal of Group VIII of the Periodic Table.

* * * * *